United States Patent [19]

Farris et al.

[11] Patent Number: 5,232,778
[45] Date of Patent: Aug. 3, 1993

[54] POLYESTER FIBERS CONTAINING LIQUID CRYSTAL COPOLYMER CONTAINING ALKOXY-SUBSTITUTED PARA-PHENYLENE TEREPHTHALATE GROUPS

[75] Inventors: Richard J. Farris, Leeds; Scott L. Joslin, Amherst, both of Mass.; Reiner Giesa, Goleta, Calif.

[73] Assignee: University of Massachusetts at Amherst, Amherst, Mass.

[21] Appl. No.: 958,373

[22] Filed: Oct. 8, 1992

[51] Int. Cl.$^5$ .............................. D02G 3/00
[52] U.S. Cl. ................... 428/364; 528/176; 528/219; 528/272; 528/300; 528/301; 528/302; 528/308; 528/308.6; 525/437; 525/444; 525/448; 428/480

[58] Field of Search ............ 528/272, 300, 301, 302, 528/308, 308.6, 176, 219; 525/437, 444, 448; 428/364, 480

[56] References Cited

U.S. PATENT DOCUMENTS

| | | | |
|---|---|---|---|
| 4,101,605 | 7/1978 | Gergen et al. | 525/92 |
| 4,442,057 | 4/1984 | Brody | 264/176 |
| 4,518,744 | 5/1985 | Brody | 525/184 |
| 4,565,850 | 1/1986 | Prevorsek et al. | 525/425 |
| 4,611,025 | 9/1986 | Akkapeddi et al. | 524/449 |
| 4,728,698 | 3/1988 | Isayev et al. | 525/439 |

FOREIGN PATENT DOCUMENTS 2161171 1/1986 United Kingdom .

OTHER PUBLICATIONS

"Polymer Blends Containing Liquid Crystals": A. Review: D. Dutta et al., Polymer Engineering and Science, Mid-Sep. 1990, vol. 30, No. 17, pp. 1005-1018.
"Synthesis and characterization of extended rod thermotropic polyesters with polyoxyethylene pendant substituents", R. W. Lenz et al. Polymer, 1991, vol. 32, No. 9, pp. 1703-1712.

Primary Examiner—Samuel A. Acquah
Attorney, Agent, or Firm—Richard P. Fennelly; Louis A. Morris

[57] ABSTRACT

Polyester fibers comprising a poly(alkylene) terephthalate matrix containing either random or block copolyesters which are liquid crystalline and which contain: (a) alkoxy-substituted para-phenylene terephthalate groups (i.e., derived from an analogously substituted hydroquinone reagent); and (b) alkylene-terephthalate groups (e.g., where the alkylene moiety contains 2 to 10 carbon atoms).

9 Claims, 1 Drawing Sheet

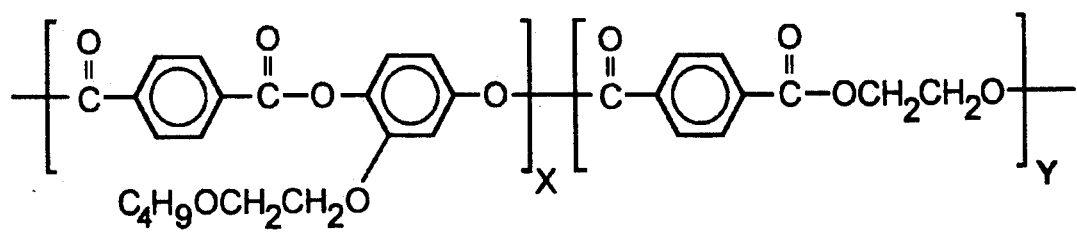
PBEM-Block    PET-Block
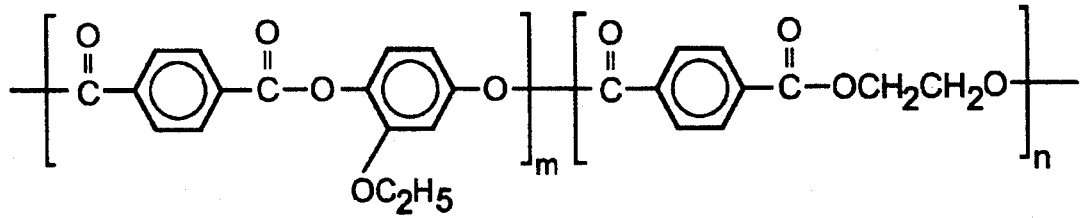
Random Copolymer

POLYESTER FIBERS CONTAINING LIQUID CRYSTAL COPOLYMER CONTAINING ALKOXY-SUBSTITUTED PARA-PHENYLENE TEREPHTHALATE GROUPS

BACKGROUND OF THE INVENTION

A variety of liquid crystal polymer and copolymer compositions are known to persons in the art.

R. W. Lenz et al. in Polymer, 1991, Volume 32, Number 9, pp. 1703-1712, discuss the synthesis of extended rod thermotropic polyesters with polyoxyethylene pendant substituents. One class of thermotropic polyester composition which was shown by Lenz et al. and which was designated as "Series VI" contained alkoxy (e.g., methoxy or ethoxy) or $-(OCH_2CH_2)_nOR'$, with $R'$ being methyl or ethyl, side chains on a para-phenylene group derived from an analogous hydroquinone reagent and also contained a terephthaloyl group. Such polyesters were indicated as lacking a flexible alkylene spacer unit which was included in earlier polymers designated as "Series IV" which also comprise a linkage: Ar—C(O)OArOC(O)—Ar—having alkoxy or $(OCH_2CH_2)_nOR'$ substitution on the central phenylene ring. This reference does not speak of incorporation of such thermotropic polyesters for fiber production.

British Patent No. 2,161,171 gives another example of wholly aromatic polyesters having liquid crystalline characteristics which can include terephthaloyl, isophthaloyl, and alkoxy-substituted para-phenylene groups as essential components. It mentions production of fibers, films and molded articles at page 1, line 8, but appears to contemplate melt processing of the liquid crystalline polymer alone (see page 4, line 65, page 5, lines 32-39 and page 7, line 59, for example).

Isayev et al. in U.S. Pat. No. 4,728,698 speaks of incorporation of various thermotropic liquid crystal polymers into a variety of base polymers including polyesters. Wholly aromatic polyester thermotropic liquid crystal polymers are preferred.

SUMMARY OF THE INVENTION

The present invention relates to polyester fibers containing a liquid crystalline copolymer additive which comprises alkoxy-substituted para-phenylene terephthalate groups, and alkylene-terephthalate groups. Further details regarding this copolymer are provided in copending U.S. Ser. No. 07/958,382, filed on even date herewith. Both random, random block, and ordered segmented block copolymers are within the contemplation of the present invention.

DESCRIPTION OF THE DRAWING

The present description of the present invention is further illustrated by reference to the Drawing which depicts: (A) an embodiment of a block copolymer additive for use herein comprising a polybutoxyethoxy phenylene terephthalate monomer (PBEM) block and a poly(ethylene terephthalate) (PET) block and (B) a random copolymer additive alkoxy-substituted para-phenylene terephthalate, and alkylene-terephthalate moieties (or groups) which are also discernible in the block copolymer structure. As would be appreciated by the person of ordinary skill in the art, the block copolymer units "x" and "y" are more similar and regular, whereas the units "m" and "n" in the random copolymer are more randomized in size and occurrence.

DETAILED DESCRIPTION OF THE PRESENT INVENTION

The terminology "terephthalate" or "terephthaloyl" as used herein in regard to the liquid crystal additive is intended to cover or relate to groups having the structure—C(O)ArC(O)(O)—where the carbonyl groups, C(O), are bonded parato one another and Ar is a phenyl ring. Terephthaloyl chloride is a preferred reagent to supply such a group to the block and random copolymers described herein.

The terminology "alkoxy-substituted para-phenylene" in regard to the additive is meant to cover structures of the type depicted by

where A, as "alkoxy", is to be construed as encompassing both alkoxy groups directly bonded to the para-phenylene structure (Ar) as shown by —OR, with R being alkyl, or by presence of an intermediate oxyalkylene unit as in $(OR')_nOR''$, with n being 1 to 7, $R'$ being alkylene of $C_2$ to $C_6$, and $R''$ being the same as R, namely alkyl. Representative acid chloride hydroquinones and their diacetates which can be used include ethoxyethoxyethoxy hydroquinone, ethoxy hydroquinone, and ethoxy 1,4-diacetoxy benzene. The alkyl and alkylene groups are preferably lower alkyl and lower alkylene of from 1 to 4 carbon atom content.

The terminology "oxy-alkylene" is meant to encompass structures of the formula $-O-(CH_2)_n-$, where n can range from 2 to 10. Ethylene glycol is a preferred reagent to supply this group and butylene glycol is another.

Random copolymer additives in accordance with the present invention can be prepared by using conventional copolyesterification procedures which comprises reacting the selected reagents in the initial reaction mixture either by a solution polymerization process using an inert solvent, with or without an amine acid acceptor or by a melt reaction process in which a diacetate of the selected substituted hydroquinone and an aromatic dicarboxylic acid are reacted with a preformed polyester of the same aromatic acid and a different aliphatic diol, such as ethylene glycol, using a conventional esterification catalyst. The melt reaction process can be carried out in two steps: (a) initially the reaction of acid monomer and diacetate monomer with the preformed polymer to form a low viscosity melt; and (b) further polymerization of the low viscosity melt under vacuum and at a higher temperature to yield the desired copolyester. The reaction time to form the preformed polymer is one to three hours with the subsequent polymerization being three to five hours. The structure of the resulting polymer can be appropriately controlled by the molar concentration of aliphatic diol used.

In regard to block copolymer additives in accordance with another embodiment of the present invention the block containing the substituted hydroquinone derived moiety can vary from about 2 to about 10 blocks as can the polyalkylene terephthalate block. The group (—O—R—O—) in the latter block can have from about 2 to about 8 carbon atoms with 2 or 4 being most preferred and is derived from a glycol reagent.

The process of block copolymerization may comprise reacting the starting materials in an initial reaction mixture by a solution polymerization process. The reaction may be carried out in one flask wherein the two blocks are formed in two stages and the block copolymerization reaction occurs in sequence.

In a preferred process for forming a block copolymer additive, the first stage comprises the reaction of either bis(2-hydroxyethylene) terephthalate (BHET) or bis(-4hydroxybutylene) terephthalate (BHBT) with an excess of acid chloride to give an acid chloride end-capped oligomer. The reaction conditions for this stage are preferably at 100° C. for three to four hours. In the second stage, stoichiometric amounts of the acid chloride and ethoxyhydroquinone are added to the reaction vessel, and the temperature is increased to 110° C. or 200° C., depending on the solvent used.

The low temperature solution polymerization involves reaction in 1,1,2,2-tetrachlorethane, for example, with pyridine as the acid acceptor, while in the high temperature copolymerization 1-chloronaphthalene was used as a solvent and the evolved hydrogen chloride gas was removed by a constant flow of argon. The time of reaction has been varied from nineteen to forty-two hours. Further details are provided in Examples 22–28.

The block sizes can be controlled by the stoichiometry of the reactants. The ratios of the block sizes, in turn, control the structure of the polymers. The inherent viscosities (in 4-chlorophenol at 50° C.) of the series of copolyesters can be varied over a wide range from 0.2 to at least 1.3 dl/gm and higher depending upon the reaction conditions employed, namely the nature of the solvent, acid acceptor, temperature, and time of reaction.

In the poly(ethylene terephthalate)—containing copolyesters, as the ratio of the blocks containing substituted hydroquinone to those containing poly(alkylene terephthalate) varied from 3:6 to 6:6 to 6 4, the texture observed of the respective samples on the polarizing microscope at high temperatures will vary from spherulitic to biphasic to nematic. Isotropization in these liquid crystalline copolyesters was not observed up to 320° C. Crystallization was observed within the isotropic matrix on cooling for a 6:6 block copolymer. Solid phase polymerization wherein the polymer is subjected to high temperature under vacuum conditions can be used to enhance the molecular weight of the polymers to some extent.

The poly(butylene terephthalate)—containing copolyesters synthesized at lower temperatures exhibited properties which were very similar to their polyethylene terephthalate-containing counterparts. But the polymerization reactions carried out in 1-chloronaphthalene at 200° C. yielded polymers with very high solution viscosities. On heating, a nematic texture developed as observed under cross-polars and birefringence continued up to 330° C.

It is deemed that the respective amounts of units "x" or "m" and "y" or "n" depicted in the drowning can be varied widely, e.g.; from about 20% to about 80% and about 80% to about 20%, respectively, in the desired copolymer compositions.

In order to form the fibers of the present invention, the foregoing copolymer additives are blended with a poly(alkylene terephthalate) resin matrix, preferably poly(ethylene terephthalate) resin in an amount of from about 1% to about 20%, by weight of the matrix.

The following Examples illustrate further particulars of the present invention.

EXAMPLES

Materials

The thermotropic liquid crystal polymer (TLCP) used in these Examples was a statistical copolymer made from terephthaloyl chloride, ethoxyhydroquinone and ethylene glycol and was synthesized using a molar ratio of 60:40 ethoxyhydroquinone to ethylene glycol by the following general procedure:

To a 500 ml three-neck flask were added 4.356 gm (0.018 mol) of an ethoxyethoxyethoxy hydroquinone, 0.744 gm (0.012 mol) of ethylene glycol, and 2.64 gm of triethylamine as an acid acceptor. Then, 350 ml of methylene chloride was added to the flask, and the reactants were stirred vigorously with a mechanical stirrer until dissolution occurred. Then, 6.1 gm (0.03 mol) of terephthaloyl chloride was added slowly to the reaction mixture, and the contents of the flask were stirred for twenty-four hours at room temperature, and then was refluxed for twenty-four hours. A pale yellow polymer started precipitating out after about thirty minutes. The reaction was terminated at the conclusion of the second step by adding the reaction mixture to a three-fold excess of methanol, and the polymer was filtered from the solution to obtain 8.28 gm of polymer (92% yield). The polymer was dried and was extracted in a Soxhlet extractor to obtain a more pure polymer at a yield of 88%. The melting transition of the polymer was determined by DSC as indicated by a broad endotherm at approximately 160°–200° C., and the inherent viscosity was 0.645 dl/g in 4-chlorophenol at a concentration of 1% at 50° C.). The polymer was stable up to 325° C. Elemental analysis: calcd. C=63.73, H=4.89, obsvd. C=63.83, H=5.30.

The thermal transitions and inherent viscosities (IV) of the TLCP and neat poly(ethylene terephthalate) (PET) are listed in Table 1:

TABLE 1

|  | $T_m$ (°C.) | LC-LC (°C.) | IV (dl/g) |
| --- | --- | --- | --- |
| TLCP | 200 | 267 | 0.51 |
| PET | 273 | — | 2.04 |

The TLCP (60:40), with an inherent viscosity of 0.51 (dl/g), had a melting transition at 200° C. and a liquid crystal-liquid crystal transition at 267° C. as determined by differential scanning calorimetry and optical microscopy. The LC-LC transition is important since the material changed from a dense nematic to a nematic with very low thread density and exhibited a corresponding drop in melt viscosity. The decomposition temperature was determined to be 325° C. by thermogravimetric analysis.

Fiber grade poly(ethylene terephthalate) was used as the polymer matrix in these Examples and had an inherent viscosity of 2.04 (dl/g) and exhibited a melting transition at 273° C.

Methods

The blending step involved mixing the desired quantity of TLCP with PET powder. The powders are mixed for twenty-four hours and then compression molded at 270° C. for one minute. The compressed sample was consequently reground to approximately a 1000 micron particle size and dried at 120° C. for a minimum of twenty-four hours. Compression molding was required to obtain a denser powder that could effectively be fed into the extruder.

Once dried, the blends were extruded and spun into fibers. The equipment used for fiber spinning was a Randcastle mini-extruder equipped with a 1575 micron die having an aspect ratio of 10. The mini-extruder had four temperature zones which could be varied independently. The feeding, compression and melting sections, zones one, two and three respectively, were set at 220° C., 260° C. and 280° C. The temperature of the die zone was varied from 270° C. to 310° C. to determine the effects on fiber performance. The main factors for determining extrusion temperatures were die swell and the ability to obtain good fibers. The residence time of the polymer in the extruder could also be varied by adjusting the screw speed. This parameter was held constant at 30 rpm corresponding to a residence time of two to four minutes. Upon exiting the die of the extruder, the polymer was stretched using a take-up device. Take-up speeds of 75 and 225 m/min were used which corresponded to stretch ratios of 200 and 1000 respectively. The stretch ratio was determined by measuring the reduction in fiber diameter by optical microscopy.

Cold and hot drawing of fibers was performed over a standard laboratory hot plate with two variable speed motors. The cold drawing temperature was approximately 80° C. while hot drawing was done at about 190° C. A maximum draw ratio of 5.2 could be achieved with neat PET, but the LCP blend could be drawn slightly more, namely 5.5.

Tensile tests were used to determine the modulus, ultimate strength, and strain to break of the fibers. Both as-spun and post-treated fibers were evaluated. An Instron tensile tester equipped with a Toyo 550 gm load cell and a Lab Tech data acquisition system was used. Fiber diameters were measured using an Olympus microscope equipped with a calibrated scale accurate to ±0.5 micron. A minimum of five diameter measurements per fiber were obtained. Tensile properties were measured at a 10 or 20 cm/min cross-head speed for as-spun fibers and at 5 or 10 mm/min for drawn fibers. Each tensile property was averaged over nine tests and performed at ambient conditions in the laboratory.

To gain insight into the thermal response of the fibers, shrinkage and force-temperature experiments were conducted. Shrinkage experiments were performed by exposing the fibers to 190° C. for fifteen minutes and measuring the resultant dimensional changes. To measure the development of shrinkage stresses, force-temperature experiments were carried out using a TA Instruments thermal mechanical analyzer. This technique applied a constant strain and measured the development of thermal stresses with temperature change. In such a test, the fiber was placed in the TMA and an initial strain of 0.05% was imposed on the sample. The temperature of the sample was then increased at 5° C./min to 190° C., and the resultant load was monitored. After being held at 190° C. for fifteen minutes, the fiber was slowly cooled to room temperature and the stresses at 190° C. and 30° C. were recorded.

Morphology was characterized using a JEOL [JSM-35C] scanning electron microscope with an accelerating voltage of 20 kv. Fracture surfaces were prepared by snapping the materials after cooling in liquid nitrogen. These samples were mounted on aluminum stubs and sputtered with gold using an SPE Spitter Coater for enhanced conductivity.

RESULTS AND DISCUSSION

Mechanical Properties

Blends containing 2, 5, 6, 8 and 10 wt % TLCP were investigated. In order to determine the effects of LCP concentration all of these systems were spun with a die zone temperature setting of 290° C. The as-spun fiber moduli for the blends can be seen in Table 2:

TABLE 2

| % TLCP in | Modulus (GPa) | |
|---|---|---|
| PET % | As-spun | Drawn |
|  | 2 | 17 |
| 2 | 2 | 16 |
| 5 | 2.5 | 25 |
| 6 | 3 | 14 |
| 8 | 3 | — |
| 10 | 3 | — |

There was a slight increase in modulus with increasing TLCP content until a maximum was achieved at about 6% above which no further increase was apparent. Post-treatment was attempted for all blend compositions. The 8 and 10 wt % were too brittle and could not be drawn. The mechanical properties for the drawn 2, 5 and 6% blends are shown in Table 2. The 5% LCP blend exhibited a significant increase in modulus, 25 GPa, with no reduction in strength. The 6% system could not be drawn properly, numerous defects and a non-uniform fiber diameter influenced the poor mechanical performance of the fiber. The mechanical properties of the 2% system were very similar to the PET standard and suggest that this quantity of LCP is not enough to affect the fiber properties significantly.

Due to the interesting properties of the 5% system, the spinning of this blend was investigated in further detail. An evaluation of three different die zone temperature settings can be seen in Table 3 with the fibers having been stretched to various draw ratios ("DR") using a take-up speed of 75 m/min:

TABLE 3

|  | Modulus (GPa) | Ult. Strength (MPa) | Ult. Strain (%) | Shrinkage (%) | Shrinkage Stress (MPa) 190/30° C. | |
|---|---|---|---|---|---|---|
| 5% LCP 270° C. | 21 | 1,063 | 7 | 9 | | |
| 5% LCP 290° C. | | | | | | |
| DR 5.5 | 23 | 1,099 | 6 | 10 | 86 | 42 |
| DR 5.4 | 22 | 1,012 | 8 | 9 | 84 | 45 |
| DR 5.2 | 19 | 867 | 12 | 8 | 70 | 40 |
| DR 5.1 | 18 | 816 | 14 | 8 | 50 | 27 |
| DR 5.0 | 16 | 670 | 21 | 6 | 28 | 13 |
| DR 4.8 | 14 | 547 | 33 | 6 | 25 | 11 |
| 5% LCP 310° C. | 20 | 945 | 12 | 9 | | |
| PET DR 5.0 | 18 | 1,115 | 8 | 9 | 80 | 45 |

All of these systems exhibited higher moduli values compared to neat PET but the fibers spun at 290° C. showed the greatest improvement, attaining a modulus of 23 GPa with no decrease in ultimate strength. The fibers spun at 310° C. had a slightly lower modulus, 19.5 GPa, and a small reduction in ultimate strength. The cause for this decrease is unknown but 310° C. is close to the volatilization temperature of the liquid crystal and some degradation of the polymer may have occurred. In addition, at temperatures greater than 300° C.

chemical reactions such as transesterification can take place very rapidly causing changes in the system.

The effect of different draw ratios on mechanical properties was examined for the 5% blend spun at 290° C. as seen in Table 3. As the draw ratio was increased the modulus and ultimate strength improved. The modulus increased from 14 to 23 GPa and the ultimate strength improved from 500 to 1100 MPa. These increases in modulus and strength were accompanied by a corresponding decrease in the ultimate elongation of the fibers from 33 to 6%.

Thermal Behavior

The dimensional instability versus draw ratio of the 5% blend spun at 290° C. is also shown in Table 3. The free shrinkage of the fibers varied from 6 to 10% as the draw ratio was increased. Corresponding to the increase in free shrinkage was an increase in the shrinkage stresses. Comparison of the 5% blend having a draw ratio of 5.4 with the PET control reveals that similar shrinkage stresses result in equivalent dimensional changes. Thus the addition of 5% LCP does not appear to improve or detract from the fiber's thermal performance.

Morphology

Cross-sections of 5% as-spun fibers, observed using scanning electron microscopy, showed a distinct two-phase morphology with the TLCP phase elongated into fibrils. The fibrils varied in diameter from 0.2 to 0.4 microns and were uniformly dispersed throughout the PET matrix. Evidence of adhesion between the phases was not readily apparent but this could be an artifact of the sample preparation technique. It is well known that cracks tend to propagate along interfaces at liquid nitrogen temperatures. In addition, thermal expansion differences between the components may also be a contributing factor.

The preceding Examples are presented for illustrative purposes only and should therefore not be construed in a limiting sense. The scope of protection sought is set forth in the claims which follow.

We claim:

1. A fiber which comprises a polyalkylene terephthalate matrix which contains a liquid crystalline copolymer comprising:
   (a) alkoxy-substituted para-phenylene terephthalate groups; and
   (b) alkylene-terephthalate groups.

2. A fiber as claimed in claim 1 wherein the alkoxy in (a) is of the formula —OR, where R is selected from the group consisting of alkyl and $(OR')_nOR''$, where R' is alkylene, n is an integer from 1 to 7, and R'' is alkyl; the alkyl and alkylene have $C_2$–$C_4$ carbon atoms.

3. A fiber as claimed in claim 1 wherein alkylene in (b) is $C_2$ to $C_{10}$ alkylene.

4. A fiber as claimed in claim 2 wherein alkylene in (b) is $C_2$ to $C_{10}$ alkylene.

5. A fiber as claimed in any of claims 1, 2, 3 or 4 wherein the copolymer is a random copolymer.

6. A fiber as claimed in any of claims 1, 2, 3 or 4 wherein the copolymer is a block copolymer.

7. A fiber as claimed in any of claims 1, 2, 3 or 4 wherein the polyalkylene terephthalate is polyethylene terephthalate.

8. A fiber as claimed in claim 5 wherein the poly(alkylene terephthalate) is poly(ethylene terephthalate).

9. A fiber as claimed in claim 6 wherein the poly(alkylene terephthalate) is poly(ethylene terephthalate).

* * * * *